United States Patent
Nakayama

[15] 3,661,547
[45] May 9, 1972

[54] METHOD FOR MOLDING HOLLOW AND BOTTOMED GLASS ARTICLES

[72] Inventor: Toshio, Nakayama, Otu-shi, Japan
[73] Assignee: Nippon Electric Glass Company Limited
[22] Filed: May 19, 1969
[21] Appl. No.: 825,780

[52] U.S. Cl. .......................................... 65/67, 65/71, 65/77
[51] Int. Cl. .............................................................. C03b 9/04
[58] Field of Search ............... 65/76, 77, 71, 67, 227, 261, 65/321, 184, 185, 186

[56] References Cited

UNITED STATES PATENTS

| | | | |
|---|---|---|---|
| 832,212 | 10/1906 | Ripley | 65/261 |
| 1,972,717 | 9/1934 | Schutz | 65/DIG. 10 |
| 3,071,946 | 1/1963 | Watson et al. | 65/DIG. 10 |

*Primary Examiner*—Arthur D. Kellogg
*Attorney*—Hall & Houghton

[57] ABSTRACT

In mold-blowing a parison, which is glass in a still soft state, in a blow mold composed of two drum sections and one bottom section, the surface of the bottom section receiving the parison bottom is given in advance the same shape as that of the finished product and upon completion of molding by mold blowing, the bottom section is raised a predetermined distance, thereby effecting the final mold finishing so that the glass article may have the same shape and size as the finished product. Other advantages and details will be made clear.

1 Claim, 7 Drawing Figures

PATENTED MAY 9 1972 3,661,547

TOSHIO NAKAYAMA
INVENTOR

BY

ATTORNEY 3,661,547

METHOD FOR MOLDING HOLLOW AND BOTTOMED GLASS ARTICLES

BACKGROUND OF THE INVENTION

1. Field of the Invention

The present invention relates to a method and apparatus for producing glass articles, especially thick bottomed ones such as glasses and bottles.

2. Description of the Prior Art

Apparatuses and methods of this type include those disclosed in Japanese Pat. Publication Nos. 11,969/62 and 14115/63. With any of the methods disclosed in said Patent Publications, however, premolding in the blank mold is required and the premolded parison must further be mold blown in the blow mold. Press molding is utilized for premolding particularly thick bottomed glass articles; however, such press molding greatly detracts from the external appearance and quality of the glass article, so that it is not desirable to use this process in the case of articles of high quality.

Further, in producing thick bottomed glass articles solely by mold blowing in the blow mold, the great thickness of the thick bottom of the article prevents sufficient pressure from acting on the glass article during mold blowing, so that the bottom can hardly be finished to the same shape as that of the mold and particularly the corner tends to have a large curvature. Further, after the glass article is removed from the mold, the bottom sags and deforms since the thick bottom has not sufficiently been cooled and solidified. Thus, the said method is not suitable for molding thick bottomed glass articles.

SUMMARY OF THE INVENTION

The invention provides a method and apparatus for producing thick bottomed glass articles of superior appearance and quality, wherein without the need of premolding by the blank mold, the glass article is mold blown in the blow mold from the very beginning and thereafter the bottom section of the blow mold is simply moved upwardly.

BRIEF DESCRIPTION OF THE DRAWING

In the accompanying drawing showing a preferred embodiment of the present invention.

DESCRIPTION OF THE PREFERRED EMBODIMENT

Figure 1:
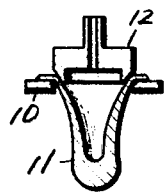
FIGS. 1 through 5 are explanatory views showing the steps of molding a glass article by a method and apparatus according to the present invention.
Figure 2:
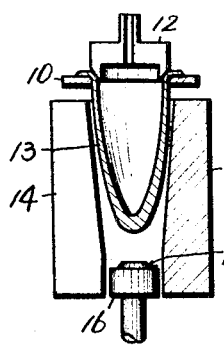
Figure 3:
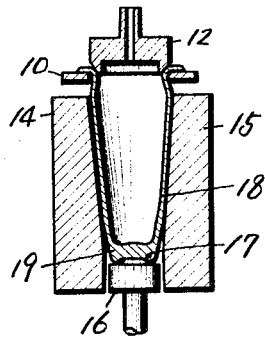
Figure 4:
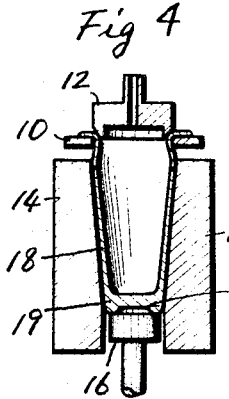
Figure 5:
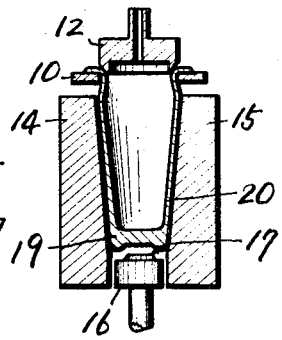

Referring to a preferred embodiment of the method of producing thick bottomed glass articles shown in FIGS. 1-5, in the present invention, a gob, namely, a soft glass mass 11 transferred to an orifice ring 10 sags under its own weight through a central hole in the orifice ring 10. A blow head 12 blows air into the cavity of the sagging glass 11 to form a prison 13 as shown in FIG. 2. The parison 13 is surrounded with a blow mold arranged as shown in FIG. 2, consisting of drum sections 14 and 15 and a bottom section 16, and it is then mold-blown. In addition, the surface 17 of said bottom section 16 is given in advance the same shape as the shape of the outer surface of the finished product. FIG. 3 shows a condition as established when the mold blowing is completed. The shape of the bottom of the glass article 18 as the mold blowing is completed does not conform to the shape of the mold and particularly the eveness of the bottom is poor. In this condition, the glass article 18 whose bottom is still soft is raised by the bottom section 16, whereby said rotating glass article 18 is brought into close contact with the inner surface of the mold constituted by the drum sections 14 and 15 and bottom section 16 to effect the final shaping of the bottom 19 of the glass article 18. Thereafter, as shown in FIG. 5, the bottom section 16 is lowered, the drum sections 14 and 15 are removed and the glass 20 is severed from the orifice 10.

In addition, the upward movement of the bottom section 16 subsequent to the completion of blow molding is effected preferably after the temperature of the glass article falls to such an extent that the thin vertical lateral wall of the glass 20 becomes no longer influenced, but it may be effected immediately after the completion of blow molding.

Further, the distance of upward movement of the bottom section 16 is about 1–5 mm. for ordinary glasses, but such distance may optionally be selected within the range of 1–30 mm. according to the shape of a glass article to be molded.

Figure 6:
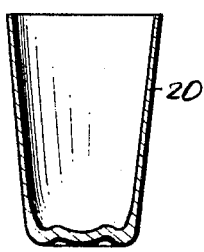
FIG. 6 is a sectional view of a glass produced by the conventional blow mold with the premolding process omitted.
Figure 7:
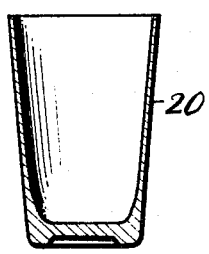
FIG. 7 is a sectional view of a glass produced by the present method with the premolding process omitted.

FIG. 6 shows a glass produced by mold blowing using the conventional blow mold without effecting premolding by the blank mold, whereas FIG. 7 shows a lateral sectional view of a glass produced by mold blowing using the present blow mold, the bottom of the glass article being shown as finally molded by raising the bottom section of the mold. Thus, according to the present invention, it is possible to obtain thick bottomed quality glass products having superior external appearance and quality without the need of effecting premolding by the blank mold.

As described above, according to the present method and apparatus, the bottom portion of a glass article difficult to mold can easily be molded or shaped by simple operation. Thus the invention is fit for the production of thick bottomed glass articles such as glasses and bottles.

In summary: the method aspect of the invention comprises in combination:

a. supporting the outer peripheral edge only of a soft mass of glass 11 between the upper surface of an annular orifice ring 10 and an undersurface of an annular gripping element 12 thus leaving unsupported the central portion thereof within said orifice ring 10, b. permitting said central portions of the mass to loosely sag by its own weight through said orifice ring 10 to form therein an upwardly opening cavity bounded by thinned side walls and a thick bottom wall, c. blowing air into the so formed cavity of the sagging portion of said mass of glass through said annular gripping element 12 to form a parison 13 thereof, d. surrounding the parison 13 with a blow mold consisting of drum sections 14, 15 and a vertically movable bottom section 16 having a lower and an upper position, as shown in FIGS. 3 and 4 respectively, e. then mold-blowing the parison while rotating the same in said blow mold, with said movable bottom section in its lower position, as shown in FIG. 3, f. then raising the vertically movable bottom section 16 of the mold to its upper position while the lower portion of the still rotating mass of glass is still soft enough to effect the final shaping of the thick bottom of the rotating article as shown in FIG. 4, and g. finally removing the blow-mold and severing the article from the orifice ring.

While the present invention has been described with reference to an embodiment thereof, it is not limited thereto. The use of the present method and apparatus in addition to premolding by the blank mold for glass articles of complicate shape makes it easier to mold the bottom portion of the article of complicate shape. Thus, the invention is applicable whether premolding be incorporated or not.

I claim:

1. A method for producing thick bottomed glass articles which comprises, in combination:

a. supporting the outer peripheral edge only of a soft mass of glass between the upper surface of an annular orifice ring and an undersurface of an annular gripping element thus leaving unsupported the central portion thereof within said orifice ring, b. permitting said central portion of the mass to loosely sag by its own weight through said orifice ring to form therein an upwardly opening cavity bounded by thinned side walls and a thick bottom wall, c. blowing air into the so formed cavity of the sagging portion of said mass of glass through said annular gripping element to form a parison thereof,
d. surrounding the parison with a blow mold consisting of drum sections and a vertically movable bottom section having a lower and an upper position,
e. then blow-molding the parison while rotating the same in said blow mold, with said movable bottom section in its lower position,
f. then raising the vertically movable bottom section of the mold to its upper position while the lower portion of the still rotating mass of glass is still soft to effect the final shaping of the thick bottom of the rotating article, and
g. finally removing the blow-mold and severing the article from the orifice ring.

* * * * *